United States Patent

[11] 3,574,390

| [72] | Inventor | William E. Metsker<br>Tulsa, Okla. |
|---|---|---|
| [21] | Appl. No. | 820,729 |
| [22] | Filed | May 1, 1969 |
| [45] | Patented | Apr. 13, 1971 |
| [73] | Assignee | Avco Corporation<br>Tulsa, Okla. |

[54] APPARATUS FOR MAKING VEHICLE BODIES
6 Claims, 3 Drawing Figs.

[52] U.S. Cl. ................................................. 296/28,
52/79, 52/284, 52/630, 296/31
[51] Int. Cl. ........................................................ B62d 39/00
[50] Field of Search............................................ 296/28,
28(.1), 28(.2), 31, 31 (P); 52/79, 275, 284, 630

[56] References Cited
UNITED STATES PATENTS

| 2,857,196 | 10/1958 | Sheppard | 296/28(.2) |
|---|---|---|---|
| 3,084,973 | 4/1963 | Beckley | 296/31(P) |

FOREIGN PATENTS

| 484,658 | 9/1958 | Italy | 296/28(.1) |

*Primary Examiner*—Benjamin Hersh
*Assistant Examiner*—John A. Pekar
*Attorneys*—Charles M. Hogan and Gary M. Gron ABSTRACT: The disclosure illustrates a trailer vehicle formed from upper and lower molded shells. A series of lateral roof braces are positioned at given spacings along the inside roof of the vehicle. The roof braces have recesses in their ends which receive one-piece vertical sidewall braces for reinforcing both the upper and lower shell walls. The sidewall braces are pivoted to a vertical position relative to the trailer shells and fixed to the upper and lower shells. The sidewall braces additionally provide a support for interior wall paneling.

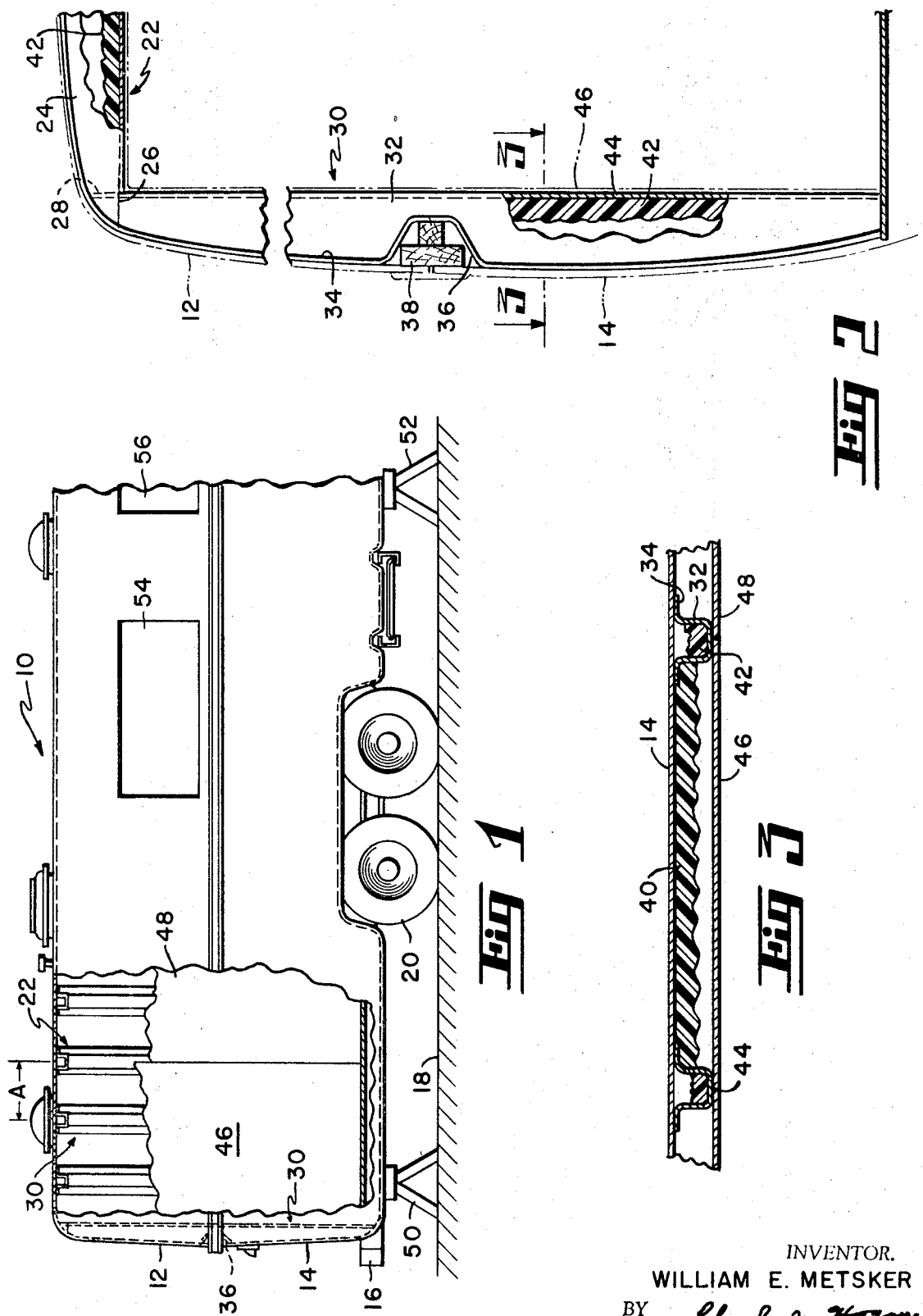

APPARATUS FOR MAKING VEHICLE BODIES

BACKGROUND OF THE INVENTION

This invention relates to vehicle body construction and more particularly to construction of a thin-walled molded vehicle.

It is well known in the art to manufacture vehicle bodies from molded, thin wall shells of impregnated resinous material. This material is selected because of its high strength, resistance to corrosion and the ease with which it can be molded into complex shapes. One of the problems encountered with this type of construction is that the thin wall shells have very little lateral stiffness, thereby requiring additional stiffening. Stiffening may be provided by braces which also provide a support for walls and ceiling panels that form the interior of the trailer. When these braces are used as a support for interior walls, it is necessary that they be precisely positioned to provide proper support for the junction of the panels that form the interior walls. In practice this positioning is difficult because the braces are positioned along the interior after the shells are joined and it is time consuming and complicated to measure off the location of the braces.

SUMMARY OF THE INVENTION

It is an object of the present invention, then, to reinforce the walls of a molded shell trailer in such a fashion that the reinforcing is easily, efficiently and accurately positioned.

These ends are achieved by forming upper and lower vehicle body shells. A series of lateral roof braces, having guide means at their ends, are fixed on the inside wall of the upper shell at a predetermined spacing. The upper and lower shells are joined and placed on a horizontal surface. The upper ends of a series of vertical sidewall braces, extending substantially the height of the joined shells, are placed into engagement with the guide means of the roof braces. The vertical sidewall braces are pivoted to a vertical position relative to the horizontal surface and fixed to the upper and lower shells.

The above and other related objects and features of the present invention will be apparent from a reading of the following description of the disclosure shown in the accompanying drawings and the novelty thereof pointed out in the appended claims.

DESCRIPTION OF THE INVENTION

In the drawings:

FIG. 1 is a side elevational view of a trailer illustrating a reinforcing arrangement embodying the present invention;

FIG. 2 is an enlarged fragmentary cross-sectional view of the trailer shown in FIG. 1;

FIG. 3 is an enlarged view taken on lines 3–3 of FIG. 2.

Referring particularly to FIG. 1, there is shown a vehicle 10, such as a travel trailer, comprising upper and lower premolded, impregnated resinous shells 12, 14 respectively mounted on a suitable ladder-type frame 16. The upper and lower shells 12, 14 are joined along a T-shaped member 38 extending around the trailer 10, as shown in FIGS. 1 and 3. The trailer 10 is supported for movement along a horizontal surface 18 by wheels 20. The bottom shell 14 of the trailer may be reinforced in accordance with the features outlined in copending Pat. application entitled "Trailer Construction," in the names of Robert F. McCollum and Gerald W. Ward, Ser. No. 780,429, filed Dec. 2, 1968, and assigned to the same assignee as the present invention. The present invention, however, is directed to a means for reinforcing the upper and sidewalls of the trailer 10.

As shown in FIGS. 1 and 2, the upper walls of the trailer are reinforced by a series of lateral roof braces 22 suitably secured, e.g. with resinous cement, to the inner ceiling wall of shell 12. The roof braces are comprised of thin wall, channel-shaped premolded fiberglass elements having flanges 24 to provide a substantial contact area with the walls of shell 12. The roof braces 22 are positioned at predetermined spacings A, as will be described below.

The roof braces 22 have openings 26 in their opposite ends. These openings act as guides for the necked-down upper end 28 of a series of vertical sidewall braces 30. The sidewall braces 30 are comprised of channel-shaped premolded fiberglass elements 32 having flanges 34. Notches 36 provide clearance around the T-shaped member 38. The braces 30 have outer sides including flanges 34, conforming to and fixed to the shells 12, 14 as by resinous cement. An inner base side 44 extends in a vertical direction and provides a support for interior wall panels 46, 48 which are secured to the base 44 side.

It was previously noted that the sidewall braces 30 are positioned at a given spacing A. This distance is selected so that a vertical brace always is positioned at a junction between panels 46, 48 of given standard width. In the usual instance, the panels have a 4-foot width and the vertical sidewall braces are positioned at 16-inch intervals so that a panel always joins an adjacent panel along a vertical sidewall brace.

To provide thermal insulation for the walls of the trailer, a layer of foamed insulating 40 is applied to the upper and lower shells 12, 14 in between adjacent braces. In addition, the inside of the channel-shaped braces 30, 22 have a layer of foamed insulating material 42.

The above trailer vehicle is assembled in the following manner. The upper and lower shells are molded in the usual fashion. Before the upper shell 12 is removed from its mold the roof braces 22 are fixed to the inside ceiling wall of the shell at the given spacings A by means of an exterior guide suitably referenced to the mold for the shell. This enables a very precise lateral placing of the ceiling braces. The shells 12, 14 are removed from their molds, the shell 14 secured to the frame 16 and the shell 12 secured to the shell 14 at the T-shaped member 38. The frame 16 and the floor of the lower shell 14 are placed in a horizontal plane by means of end supports 50, 52.

The sidewall braces 30 are premolded and the layer of foamed insulating material 42 is positioned along their interior. The vertical sidewall braces are then inserted into the openings 26 in the ceiling braces 22. The sidewall braces 30 are then pivoted to a vertical position relative to the floor of the lower shell 14. This may be accomplished by means of a level, plumb line or other suitable device. The sidewall braces are then secured to the upper and lower shells 12, 14. The layer of foamed insulating material 40 is then applied to the inner walls of the shells 12, 14 between adjacent braces 30 and adjacent braces 24.

At this point windows 54, 56 may be cut out. It should be noted that these windows may cut through a vertical side rib thereby eliminating it as a full length reinforcing member. However, the ribs 30 that are interrupted by the windows still function to provide a base for the paneling.

After the windows have been cut, the panels 46, 48 are secured to the sidewall braces 30 by stapling or other suitable means. It should be emphasized again that with the given spacing A between the sidewall braces 30, the junction between panels 46, 48 always falls along a sidewall brace to provide secure joining of the panels.

The invention described above provides an extremely efficient and simple method to accurately position interior braces on a thin-wall, molded shell trailer. The sidewall braces 30 act to reinforce the entire sidewall of the vehicle 10 but do not add significantly to the vehicle weight because of their thin-walled channel-shaped construction. Furthermore, this construction enables a more complete insulation of the interior walls of the trailer, thereby providing a comfortable environment for the trailer occupants.

I claim:

1. A trailer vehicle body comprising:
   upper and lower shells each having sidewalls joined in a median plane and having generally parallel ceiling and floor walls;
   a plurality of lateral roof braces positioned on the inside wall of said upper shell at a predetermined spacing;
   guide means positioned in the ends of each of said lateral roof braces;

a plurality of sidewall braces fixed to the sidewalls of said upper and lower shells and having upper ends only engaging said guide means, all of said sidewall braces being positioned perpendicular to said floor wall;

whereby said sidewall braces are accurately positioned in the interior of said vehicle body by the guide means in the ends of said lateral roof braces.

2. A trailer vehicle body as in claim 1 wherein:

said upper and lower shells have curved sidewalls;

said vertical sidewall braces have one side conforming with the interior walls of said shells and having the opposite sides substantially vertical;

said trailer vehicle body further comprises inner wall panels secured to the vertical side of said sidewall braces.

3. A trailer vehicle body as in claim 2 wherein said wall panels have a predetermined width and said roof braces an sidewall braces have a predetermined spacing so that the said sidewall braces are positioned along the junction of adjacent wall panels.

4. A trailer vehicle body as in claim 1 wherein said sidewall braces are premolded thin wall channel-shaped members having flanges extending normal to the open ends of said channel-shaped member, said flanges conforming to the inner sidewalls of the upper and lower shells.

5. A trailer vehicle body as in claim 4 further comprising:

a layer of foamed insulating material positioned along the inner base wall of said channel-shaped sidewall braces;

a layer of foamed material secured to the interior walls of said upper and lower shells between adjacent braces.

6. A trailer vehicle body as in claim 5 wherein:

said upper and lower shells have curved sidewalls;

the flanges of said sidewall braces conform to the interior walls of said shells and the base of said channel-shaped member positioned substantially vertical with respect to said floor wall;

said trailer vehicle body further comprises interior wall panels secured to the base of said channel-shaped sidewall braces.